UNITED STATES PATENT OFFICE.

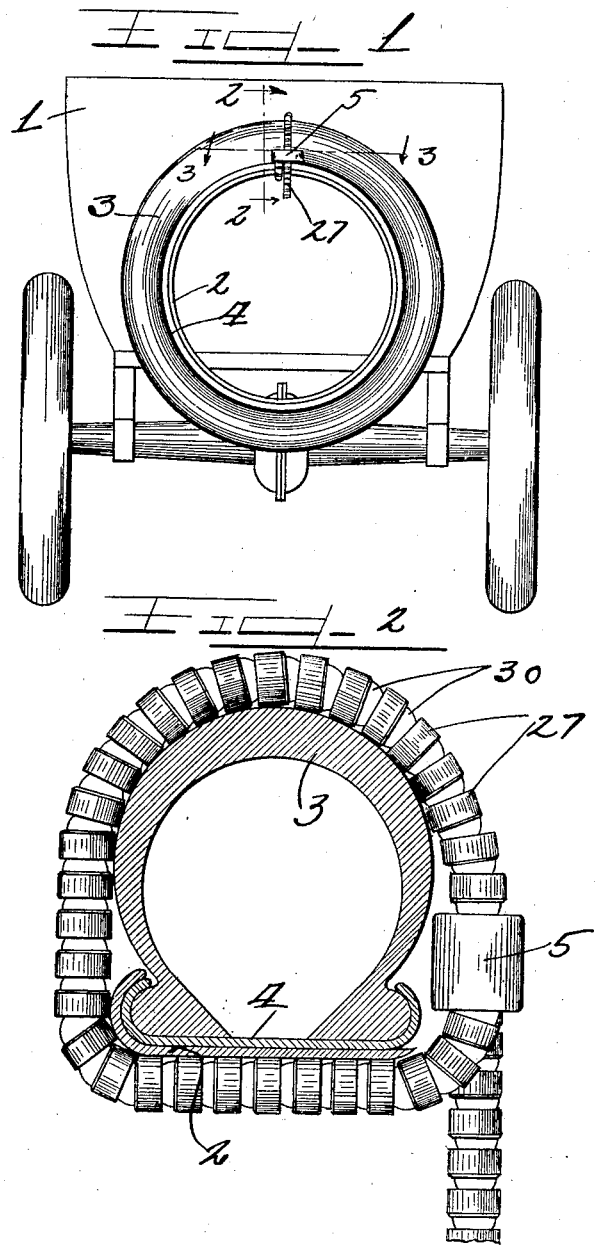

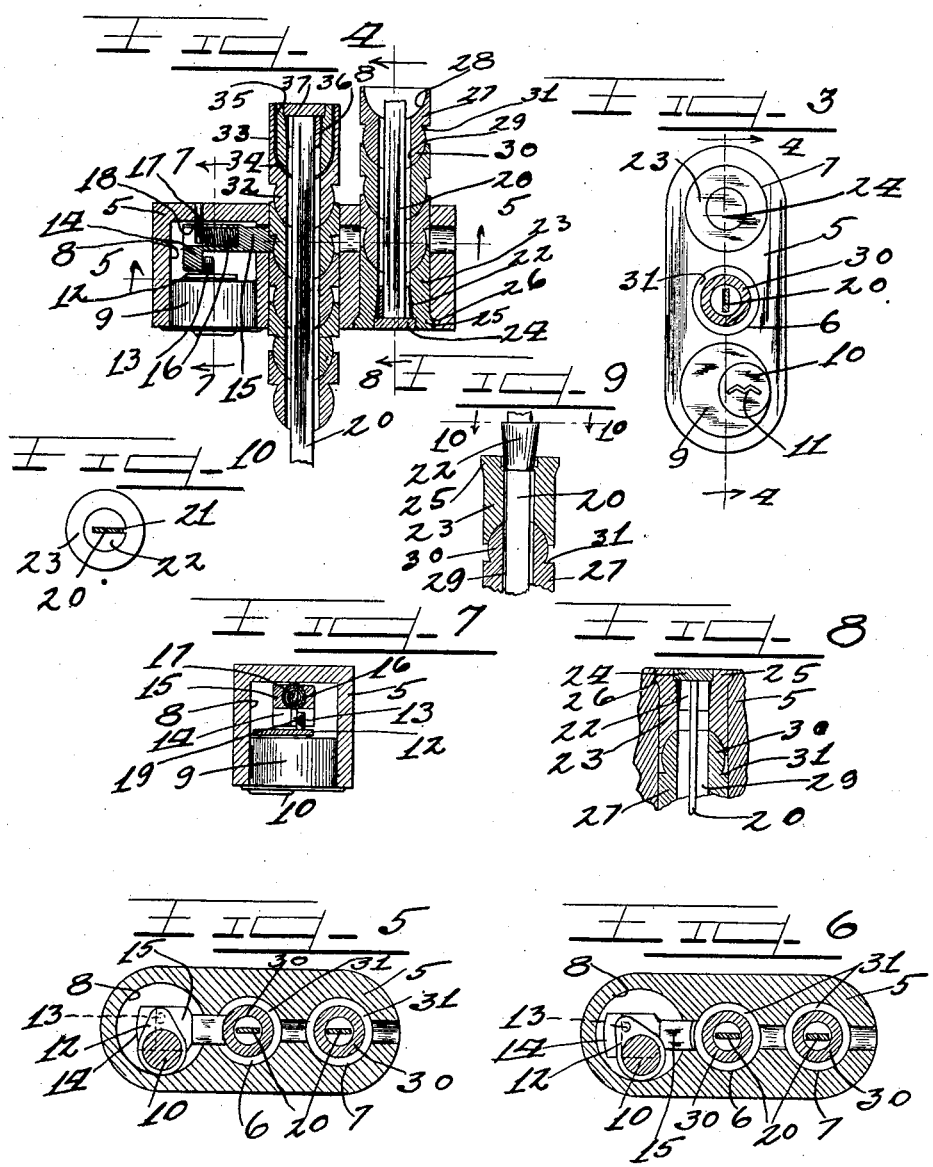

COLVIN L. JOHNSON, OF CHICAGO, ILLINOIS, ASSIGNOR TO JOHNSON AUTOMOBILE LOCK CO., OF CHICAGO, ILLINOIS, A CORPORATION OF ILLINOIS.

AUTOMOBILE-TIRE-LOCK CABLE.

1,394,259.        Specification of Letters Patent.        Patented Oct. 18, 1921.

Application filed February 6, 1920. Serial No. 356,737.

*To all whom it may concern:*

Be it known that I, COLVIN L. JOHNSON, a citizen of the United States, and a resident of the city of Chicago, in the county of Cook and State of Illinois, have invented certain new and useful Improvements in an Automobile-Tire-Lock Cable; and I do hereby declare that the following is a full, clear, and exact description of the same, reference being had to the accompanying drawings, and to the numerals of reference marked thereon, which form a part of this specification.

This invention relates more particularly to an improved type of a flexible armored cable adapted for use in connection with automobile tire locks to tightly engage around a tire of any desired size without causing injury to said tire.

It is an object of this invention to provide an improved armored cable for use with automobile tire locks.

It is also an object of the invention to construct an armored cable wherein the casing links are held in operating engagement with each other by an axially disposed steel retaining strap.

Another object of the invention is to construct an armored cable having the ball and socket links thereof connected by a flat metal strip which so closely holds the links associated with each other that the metal strip is inaccessible.

It is a further object of the invention to construct a tire lock adjustable to fit tires of various sizes.

It is an important object of this invention to provide an improved automobile tire lock wherein a flexible armored cable is constructed with ball and socket links which are drawn toward one another by a flat steel strap the ends of which are securely clamped in the terminal links of the cable.

Other and further important objects of this invention will be apparent from the disclosures in the drawings and specification.

The invention (in a preferred form) is illustrated in the drawings and hereinafter more fully described.

On the drawings:

Figure 1 is a rear elevation of an automobile showing a spare tire locked in place by means of an improved tire lock embodying the principles of this invention.

Fig. 2 is an enlarged sectional view taken on line 2—2, of Fig. 1.

Fig. 3 is an enlarged view of the lock block taken on line 3—3, of Fig. 1.

Fig. 4 is a section taken on line 4—4, of Fig. 3, with parts in elevation.

Fig. 5 is a section taken on line 5—5, of Fig. 4.

Fig. 6 is a similar section showing the position of the locking bolt in release position.

Fig. 7 is a section taken on line 7—7, of Fig. 4, with parts in elevation.

Fig. 8 is a fragmentary detail section taken on line 8—8, of Fig. 4.

Fig. 9 is a fragmentary detail section of the attaching end of the armored cable in the process of construction.

Fig. 10 is a sectional view taken on line 10—10, of Fig. 9.

As shown on the drawings:

The reference numeral 1, indicates an automobile having rigidly supported on the rear thereof a spare tire support or carrier rim 2, for removably receiving and holding a spare tire 3, in position. The spare tire rim 4, is adapted to slide on the supporting rim 2, and for the purpose of retaining the spare tire in place an improved tire lock is used, as shown in Figs. 1 and 2.

The tire lock comprises a metal block 5, provided with cable openings 6 and 7, and with a lock chamber or recess 8. Securely mounted in the chamber 8, is a cylinder lock 9, provided with a rotating barrel or cylinder 10, having a key slot 11, for the purpose of receiving a key for rotating said barrel. Engaged on the inner end of the barrel 10, is a cam or crank plate 12, carrying a pin 13. The pin 13, is positioned to contact a lug 14, integrally formed on one end of an adjustable locking bolt or latch 15, which, as shown in Fig. 4, is slidably mounted in the block chamber 8, with the inner notched end thereof projecting into the cable opening 6. Normally the locking bolt 15, is held projected in a locking position by means of a spring 16, mounted in said locking bolt with the rear end pressing against a stationary pin 17, which is rigidly secured in the block 5, and projects through a slot 18, provided in said locking bolt. A recess 19, is provided in the lug 14, for releasably receiving the pin 13, when the bolt 15, is retracted.

The block openings or passages 6 and 7, are adapted for receiving the improved armored cable, which is shown in detail in Figs. 2 and 4. The armored cable comprises a flexible flat axial steel strap 20, of rectangular cross-section, having one end thereof rigidly clamped in a slot 21, of a conical or tapered wedge block or plug 22. The slotted wedge plug 22, is driven into one end of a cable terminal attaching head 23, and covered by a finishing plug disk 24, which is also forced into the terminal head 23, and lies flush with the end of said terminal head. The terminal head 23, is provided with an integral flange or rim 25, so that the head 23, cannot be drawn completely through the opening 7, of the block 5. A recess 26, is provided in the block 5, for the reception of the flange 25 of the cable head 23.

Arranged adjacent one another in interfitting adjustable relation on the flat metal core strap 20, are a plurality of cable casing links or knuckles of identical construction. Each cable link embraces a cylindrical socket head 27, one end of which is provided with a semi-circular socket or recess 28, which communicates with one end of a cylindrical axial passage 29, formed in each link for the reception of the core strap 20. Integrally formed on the other end of the link socket head 27, is a ball plug 30, of substantially spherical form to movably fit into the recess 28, of an adjacent cable link to form a ball and socket connection. A shoulder 31, is formed on each cable link where the socket head 27 joins the ball plug 30.

Provided at the second end of the core strap 20, is a terminal head or knuckle comprising an axially passaged ball plug 32, having integrally formed thereon a cylindrical socket head 33, provided with a socket or recess 34, into which the core strap 20, projects. For the purpose of tensioning the flat metal core strap 20, to hold the interfitting ball and socket cable links 27—30, in tight frictional relation, a passaged plug 35, is seated in the recess 34, of the end socket head 33. With one end of the core strap 20, rigidly clamped in the slotted wedge plug 22, of the cable terminal head 23, the other end of said core strap is pulled through a slot of a second wedge plug 36, which is forced or wedged into the outer end of the plug 35, thereby causing the slotted wedge plug to securely grip or clamp the core strap in its tensioned condition. A finished plug disk 37, is forced into the end of the terminal plug 35, to cover the end of the wedge plug 36, after the projecting end of the core strap has been cut off. It will thus be seen that the automobile tire lock is provided with a flexible armored cable, the flat steel core strap 20, of which is tensioned between the cable terminal members to hold the intermediate cable links or knuckles adjustably engaged in interfitting relation against separation by means of tools used by unauthorized persons desiring to gain access to the steel core strap 20, to cut or file the same for the purpose of removing the tire lock and stealing the spare tire.

The operation is as follows:

The spare tire 3 and its rim 4, are placed upon the automobile carrier rim 2, and the armored cable is engaged around the spare tire 3 and the carrier rim 2, as shown in Fig. 2, so as to pull the cable terminal head 23, into seated position within the block opening 7, as shown in Fig. 4. The free end of the armored cable is inserted through the block opening 6. The free end of the cable is then gripped and pulled through the block 5, until the cable firmly grips around the tire to hold the same locked in position on the mounting rim 2.

During the pulling of the flexible cable through the block passage 6, the spring impelled locking bolt or latch 15, is forced into retracted position by the cylindrical heads 27, of the intermediate links of the cable. As each link head 27, passes the beveled inner end of the locking bolt 15, said bolt is projected inwardly by its spring 16, to engage behind the shoulder 31, of said link to prevent retraction of the cable from the block 5.

When it is desired to remove the spare tire 3, from the rim 2, a key is inserted into the key slot 11, to rotate the cylinder or barrel 10. Rotation of the barrel 10, causes the crank plate 12, to force the pin 13, against the lug 14, of the locking bolt 15, The bolt 15, is thereby retracted against the action of its spring 16. When this occurs the inner end of the locking bolt 15, is withdrawn from its engagement with one of the cable shoulders 31, and the cable may be withdrawn from the opening 6, of the block 5, to permit removal of the spare tire 3, from the carrier rim 2.

I am aware that numerous details of construction may be varied through a wide range without departing from the principles of this invention, and I therefore do not purpose limiting the patent otherwise than necessitated by the prior art.

I claim as my invention:

1. An armored cable comprising a core member, a plurality of passaged intermediate cable links engaged on said core member, a terminal head in engagement with one of the end intermediate links, a wedge plug engaged on one end of said core member and driven into said terminal head to hold the core member secured in said terminal head, a second terminal head interfitting the other intermediate end link, a plug member therein, and a wedge plug engaged on the other end of said core member and driven into said plug member to tension the core member for holding the intermediate cable links in coacting interfitting relation.

2. An armored cable comprising a metal core strap, interfitting ball and socket links engaged on said core strap, a terminal head interfitting with the last link at one end of the cable, a slotted wedge member engaged on one end of said core strap and driven into said terminal head, a plug disk engaged in said terminal head to cover said wedge member, a second terminal head on said core strap and interfitting with the last cable link at that end of the cable, a plug in said second terminal head, a slotted wedge member engaged on the other end of said core strap and driven into said plug to tension the core strap and hold the cable links in interfitting relation, and a plug disk secured in said plug to cover the end of said last mentioned wedge member.

3. An armored tire lock cable comprising a metal strip, interfitting links engaged therearound to inclose said strip, and means wedged into the end links and clamped onto said strip to tension the same.

4. An armored tire lock cable comprising a core strip, interfitting ball and socket links engaged around said strip, terminal links forming the ends of said cable, and slotted wedge plugs engaged on the ends of said strip and driven into said terminal links to tension said strip for holding the ball and socket links in operating relation.

5. An armored tire lock cable comprising a flat metal strip, interfitting intermediate links engaged around said strip and having shoulders formed thereon, terminal links interfitting the end intermediate links, a slotted wedge engaged on one end of said strip and driven into one of said terminal links, a plug in the other terminal link, and a second slotted wedge engaged on the other end of said strip and driven into said plug to tension said strip to hold all of said links in adjustable relation to keep said strip inaccessible.

In testimony whereof I have hereunto subscribed my name in the presence of two subscribing witnesses.

COLVIN L. JOHNSON.

Witnesses:
LAWRENCE REIBSTEIN,
FRED E. PAESLER.